(12) United States Patent
Anttila et al.

(10) Patent No.: US 8,640,225 B2
(45) Date of Patent: *Jan. 28, 2014

(54) METHOD AND APPARATUS FOR VALIDATING RESOURCE IDENTIFIER

(75) Inventors: Akseli Anttila, Helsinki (FI); Yumiko Tanaka, London (GB); Robert Grant, Barnehurst (GB); Mischa Weiss-Lijn, London (GB)

(73) Assignee: Nokia Corporation, Espoo (FI)

( * ) Notice: Subject to any disclaimer, the term of this patent is extended or adjusted under 35 U.S.C. 154(b) by 370 days.

This patent is subject to a terminal disclaimer.

(21) Appl. No.: 12/889,637

(22) Filed: Sep. 24, 2010

(65) Prior Publication Data

US 2012/0079562 A1  Mar. 29, 2012

(51) Int. Cl.
*G06F 7/04* (2006.01)

(52) U.S. Cl.
USPC .................. 726/17; 726/4; 726/21

(58) Field of Classification Search
None
See application file for complete search history.

(56) References Cited

U.S. PATENT DOCUMENTS

| | | | |
|---|---|---|---|
| 6,269,370 B1 | 7/2001 | Kirsch | |
| 7,058,978 B2 * | 6/2006 | Feuerstein et al. | 726/26 |
| 7,089,582 B1 | 8/2006 | Dutta | |
| 7,552,466 B2 | 6/2009 | Rosenberg et al. | |
| 8,091,119 B2 * | 1/2012 | Brown et al. | 726/4 |
| 2004/0010543 A1 | 1/2004 | Grobman | |
| 2008/0010368 A1 | 1/2008 | Hubbard et al. | |
| 2008/0028307 A1 | 1/2008 | Oh | |

FOREIGN PATENT DOCUMENTS

| | | |
|---|---|---|
| EP | 1564679 A2 | 8/2005 |
| KR | 20070002182 A | 1/2007 |
| KR | 100746482 B1 | 7/2007 |
| WO | 03079133 A2 | 9/2003 |
| WO | 2007121791 A1 | 11/2007 |

OTHER PUBLICATIONS

International Search Report and Written Opinion, received in corresponding Patent Cooperation Treaty Application No. PCT/FI2011/050760, dated Dec. 19, 2011, 14 pages.

* cited by examiner

*Primary Examiner* — Pramila Parthasarathy
(74) *Attorney, Agent, or Firm* — Ditthavong Mori & Steiner, P.C.

(57) ABSTRACT

An approach is provided for requesting access to content associated with a resource identifier. A system receives a first request to access content associated with a resource identifier. The system then determines to generate a second request for validating the content based, at least in part, on the resource identifier and to transmit the second request to a validation service. The system receives validation information based, at least in part, on the second request. In one embodiment, the validation information includes a preview of the content.

20 Claims, 14 Drawing Sheets

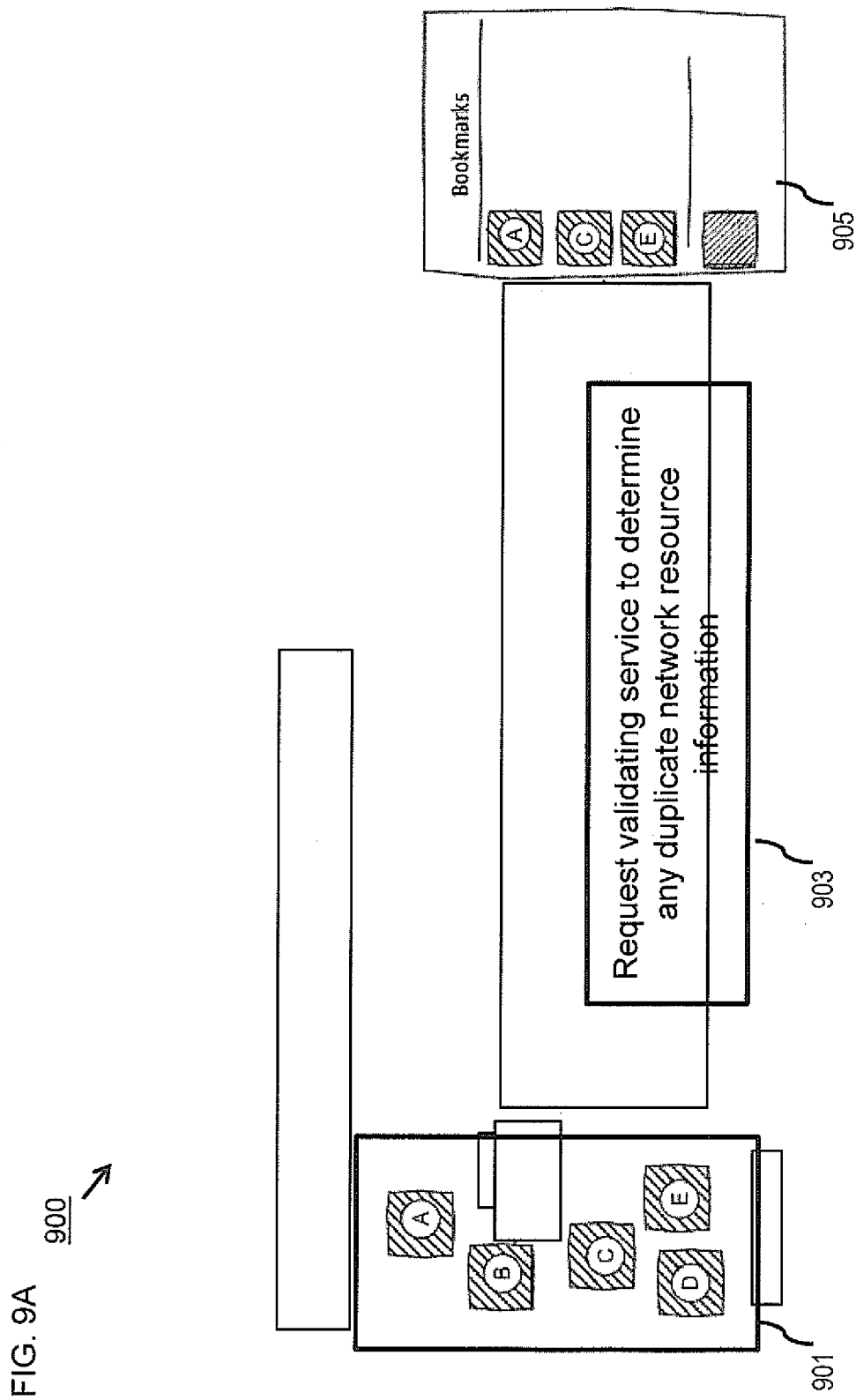

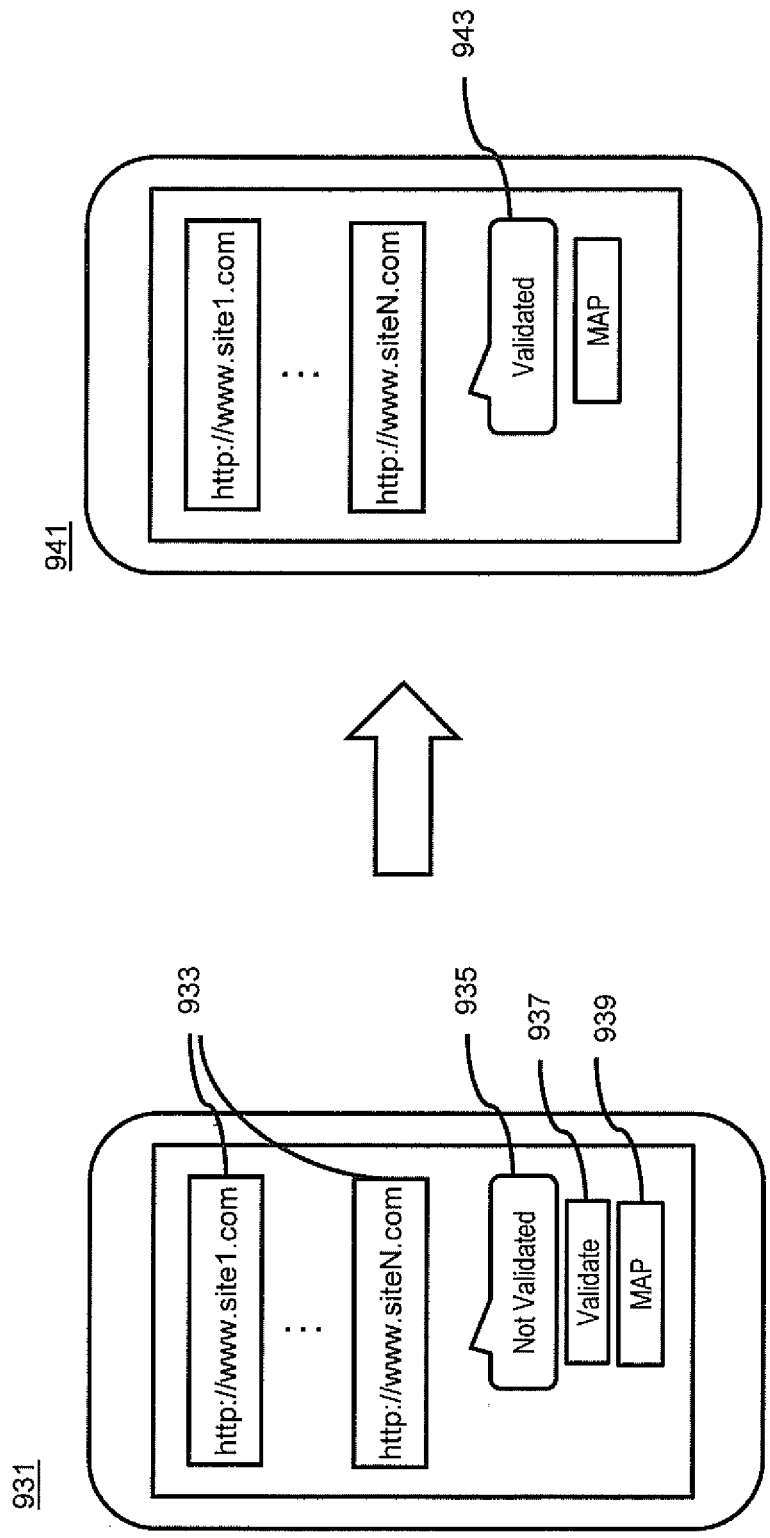

1000

METHOD AND APPARATUS FOR VALIDATING RESOURCE IDENTIFIER

BACKGROUND

Modern communication networks provide access to an ever increasing variety and number of online services (e.g., databases, information, services, commerce, etc.) to users and user devices. Many of these services deal with connecting the user devices to one or more network resources (e.g., product/service information, social networking services, product/service purchasing sites, etc.) by providing a uniform resource locator (URL) indicating a resource identifier.

SOME EXAMPLE EMBODIMENTS

Therefore, there is a need for robust and user-friendly methods for validating one or more resource identifiers (URLs).

According to one embodiment, a method comprises receiving a first request to access content associated with a resource identifier. The method also comprises determining to generate a second request for validating the content based, at least in part, on the resource identifier. The method further comprises determining to transmit the second request to a validation service. Further, the method comprises receiving validation information based, at least in part, on the second request.

According to another embodiment, an apparatus comprising at least one processor, and at least one memory including computer program code, the at least one memory and the computer program code configured to, with the at least one processor, cause, at least in part, the apparatus to receive a first request to access content associated with a resource identifier. The apparatus is also caused to determine to generate a second request for validating the content based, at least in part, on the resource identifier. The apparatus is further caused to determine to transmit the second request to a validation service. Further, the apparatus is caused to receive validation information based, at least in part, on the second request.

According to another embodiment, a computer-readable storage medium carrying one or more sequences of one or more instructions which, when executed by one or more processors, cause, at least in part, an apparatus to receive a first request to access content associated with a resource identifier. The apparatus is also caused to determine to generate a second request for validating the content based, at least in part, on the resource identifier. The apparatus is further caused to determine to transmit the second request to a validation service. Further, the apparatus is caused to receive validation information based, at least in part, on the second request.

According to another embodiment, an apparatus comprises means receiving a first request to access content associated with a resource identifier. The apparatus also comprises means for determining to generate a second request for validating the content based, at least in part, on the resource identifier. The apparatus further comprises means for determining to transmit the second request to a validation service. Further, the apparatus comprises means for receiving validation information based, at least in part, on the second request.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6-10 depict examples of one or more user interfaces for validation services on a user device, according to one or more embodiments;

DESCRIPTION OF SOME EMBODIMENTS

Figure 1:
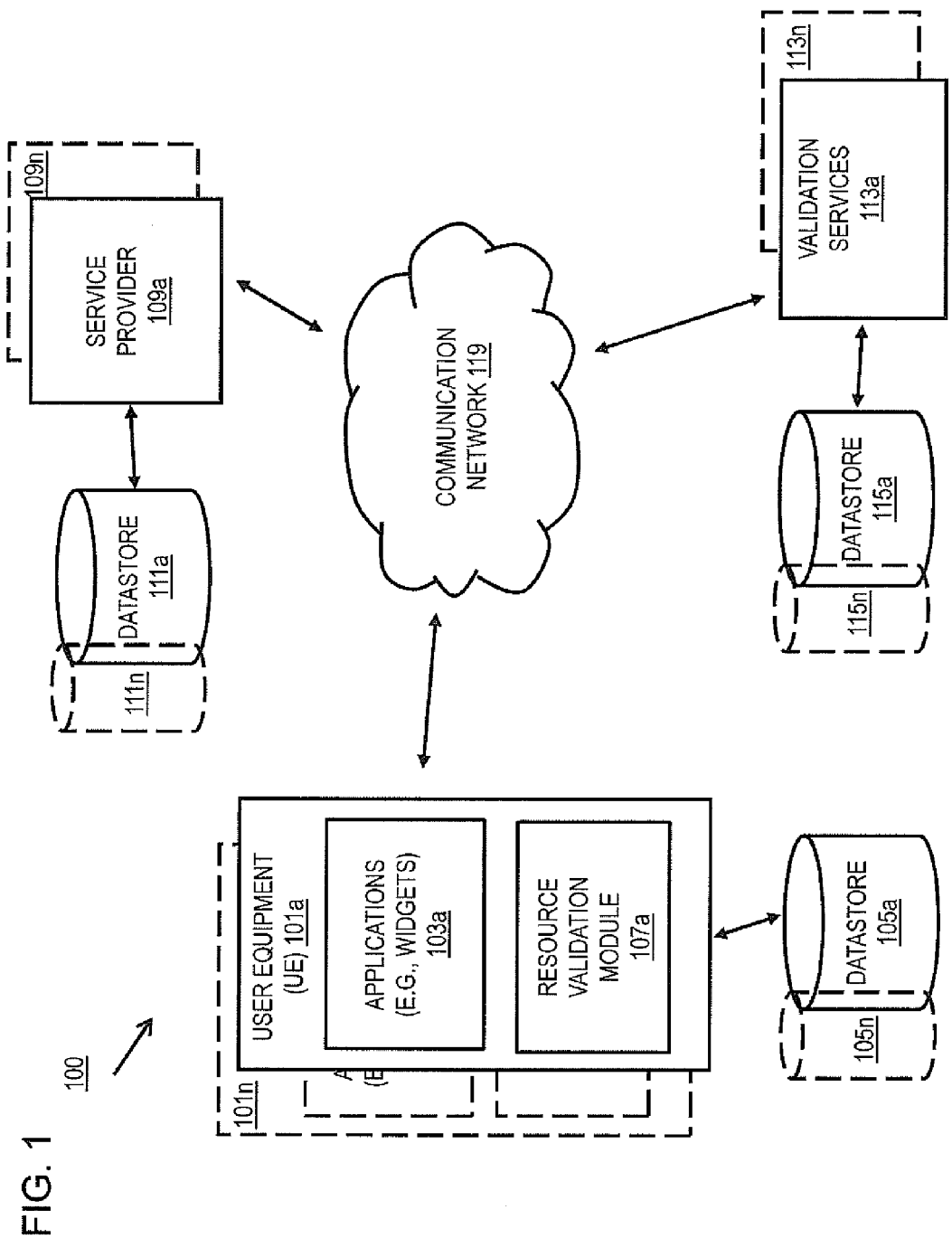
FIG. 1 is a diagram of a system capable of receiving a request for validating one or more resource identifiers, according to one embodiment.

Examples of a method, apparatus, and computer program for validating one or more resource identifiers are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "resource identifier" is also known as uniform resource locator (URL). As a broad range of services, transactions, commerce, etc. are provided and/or are conducted over the internet; service providers seek for more efficient and flexible methods to communicate their resource identifiers (URLs) to users and/or user devices. One such method often utilized is to reduce (shorten) the length of the resource identifiers (URLs) showing minimal information. However, it is possible that one or more users cannot understand the minimal information and as a consequence cannot know how and to which resource(s) the encoded resource identifiers may cause the device to connect to, or what actions the resource in the encoded resource identifiers can cause the user device to take, or whether or not the encoded resource identifiers are the intended resources the user is interested in. To combat such uncertainties and possible security risks, and to improve user online experience, the encoded resource identifiers can be sent to a validation service provider for validation of the resource identifiers before the user decides to utilize the encoded resource identifiers.

In one common scenario, a user utilizes a user device to receive/capture one or more resource identifiers for one or more products and/or services, however, the resource identifier can be in a form of encoded resource identifier. The user device may be equipped with sensors for requesting and/or receiving the encoded, or otherwise, resource identifier by wireless means such as communication via one or more cellular technologies, Bluetooth®, near field communications (NFC), radio frequency identification (RFID), infrared communication (IrDA); optical sensors for scanning information encoded on a label such as barcode and/or other optically coded patterns, and/or a camera for capturing images of the label information. The encoded resource identifier can be provided via one or more of above mentioned methods and can be available at a service point, retail establishment, on a product, at a dedicated location, and/or made available by a service and/or a product provider such as via one or more advertizing media. Further, the user device can request and receive the encoded resource identifier via other sensors and/or interface available on the device. Once the device receives the encoded resource identifier, the user can decide to connect to the resource indicated by the encoded resource identifier. However, since only a minimal amount of information is available in the encoded resource identifier, it is not sufficient to show to the user of the device what can happen if the encoded resource identifier is used to connect to a resource and/or to launch one or more applications. Further, it is possible the encoded resource identifier is tampered with by a malicious party and can cause undesired results such as launching one or more unintended applications and/or connecting to one or more unintended resources.

To address the above problems, a system 100 of FIG. 1 enables a validation service to validate a resource identifier and/or an encoded resource identifier and to initiate a transfer of the corresponding content and/or one or more content previews to a user device. More specifically, in the system 100, a user device receives a request (e.g., a first request) to access content associated with a resource identifier. Further, the user device generates another request (e.g., second request) for validating the content based, at least in part, on the resource identifier and transmits the second request to a validation service. Furthermore, the user device receives validation information based, at least in part, on the second request. In one embodiment, the validation information includes a preview of the requested content to assist in determining whether or not to access the content. By way of example, the preview may include a thumbnail image, a screen capture, or other representation of the requested content, for presentation to the user before the user or user device determines to access the content. In addition or alternatively, the validation information may include information on security risks, content ratings, content source, and the like associated with the content. Then, the user determines to access the content at the device based, at least in part, on the validation information.

FIG. 1 is a diagram of a system 100 capable of receiving a request for validating one or more resource identifiers, according to one embodiment. The system 100 comprises one or more user equipment (UEs) 101a-101n (also collectively referred to as UE 101 and/or user device) having connectivity to one or more service providers 109a-109n (also collectively referred to as service provider 109) and one or more validation services 113-a-113n (also collectively referred to as validation services 113) via a communication network 119. The UE 101 includes applications 103a-103n (also collectively referred to as applications and/or widgets 103) and resource validation module 107a-107n (also collectively referred to as resource validation module 107). The applications 103 can include, for instance, one or more user interfaces, one or more communications applications, one or more web browsers, one or more widgets, and/or other applications to support sensors such as GPS, audio/video devices, wired and/or wireless communication devices/ports and/or the like available on the UE 101. Further, the resource validation module 107 provides, at least, support (i.e., resource validation module 107) for enabling validation of one or more resource identifiers.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

Further, the service provider 109 can provide a broad range of online services; such as commerce, financial services, database access, social networking, education, internet access; and/or the like. In the example of FIG. 1, the UE 101, service provider 109, and validation services 113 include one or more data sets in their respective datastores 105a-105n (also collectively referred to as datastore 105), 111a-111n (also collectively referred to as datastore 111) and 115a-115n (also collectively referred to as datastore 115). Data maintained by the UE 101, service provider 109, and validation services 113 can be that of a static nature (e.g., textual data, graphical data) or executable (e.g., streaming media such as audio or video content).

Moreover, the service provider 109 and validation services 113 may be a hosted server platform, data warehouse, service portal, web server with associated service interface or the like for enabling access to the services at the service provider 103 and/or at the database services 113. Depending on system requirements, the datastores 111 and 115 may be distributed wherein data sets are dispersed. Alternatively, service providers 109 and validation services 113 may communicate with one another for enabling data exchange, therefore facilitating further distributed processing capability. Such an arrangement can be used for maintaining very large data sets and providing a wider range of service over a distributed system of devices, servers, processors, storage devices, etc.

In addition to the service provider 109 and validation services 113, the UE 101 may also have connectivity via the communication network 119 to other UEs (e.g., another mobile device). While shown identically in the figure, respective UEs 101a and 101n need not be implemented identically. In one embodiment, the service provider 109 and validation services 113 and their respective datastores 111 and 115 may be combined into one or more network elements in one or more configurations to provide substantially the same functionality and/or services. Furthermore, the validation services 113 can be implemented at or in conjunction with the service provider 109 and/or can be implemented at the user device UE 101.

In addition, the UE 101 can support execution of one or more applications 103 (e.g., web applications, widgets, etc.). According to one embodiment, the applications 103 can be supplied by and/or operate in conjunction with a service provider 109. By way of example, the service provider 109 can be an online application store (e.g., Nokia's Ovi Store) to provide a selection of applications for download to the UE 101 that supports any of the services available from the service provider 109 (e.g., music service, mapping service, video service, social networking service, content broadcasting service, etc.). For example, the applications and/or widgets 103 can be downloaded at the request of the user, or alternatively, be delivered based on a service operated by a service provider. An application and/or a widget 103 can thus be regarded in some respects as a user interface element, and can be downloadable and support software that provides a variety of content information, e.g., news, stock quotes, weather forecasts, maps, location information, advertisement, calendars, calendar information, contact information, messages, emails, service guide information, recommendations, audio files, video files, radio/television broadcasting, etc. A widget may be configured to continuously receive content information, such as resource information and related metadata, from one or more sources.

In one embodiment, the system 100 enables the user device to access the content without waiting to receive the validation information. In this mode of operation, the validation process is optional and can proceed in parallel with access to the content. In another embodiment, the system 100 may wait for the validation information before determining to access the content. In this way, the user can be assured of knowing the potential risks associated with accessing the content identified by the resource identifier. In yet another embodiment, the mode of operation may be selected based on context information associated with the user device. For example, the system 100 may determine whether the user device has connectivity to the validation service. If there is no connectivity (e.g., when there is no network connection), the system 100 may bypass waiting for the validation information before determining to access the content. In addition or alternatively, the system 100 may rely on previously conducted validations of the resource identifier or other similar resource identifiers. In another embodiment, the mode of the operation may be set according to the user of the user device. For example, content access can be based, at least, on the validation results, when there are restrictions on who the user may be, such as a child, an employee, a guest, a borrower of the device, and/or the like.

In another embodiment, the mode of the operation may be set according to the time, day of the week, and/or the location of the device. For example, validation information can be required for accessing content at the one or more resources if it is a work day and time is between 9:00 AM and 5:00 PM. In another example, validation information can be required for accessing content at the one or more resources if the location of the user is at, user's place of employment or at user's school.

In another embodiment, the mode of operation can be set according to the source of the resource information or identifier. For example, one or more resources, indicated by one or more resource information, can be accessed without waiting for validation information if it is recommended by a trusted source such as a family member, a friend, a colleague, a teacher, a third party having validated the resource information and/or having validation information, a government entity, an official web site of a product and/or a service provider, and/or the like.

In another embodiment, in the system 100, the user requests for information (e.g., a first request) and utilizes the user device to scan and/or capture an information barcode label/tag that includes an encoded resource identifier (e.g., a resource identifier associated with a product at a retail establishment). Then the user device sends a request (e.g., a second request) to a validating service for validating the encoded resource identifier. For example, the user initiates a first request to the user device indicating the user wishes for further information from the manufacturer of the product by capturing an encoded resource identifier. Then the user device initiates a second request to a validation service for validating the encoded resource identifier before the user decides to utilize the encoded resource identifier. In response, the validation service provides validation information related to the resource identifier scanned or captured at the user device.

In another embodiment, in the system 100, location information of a user device is included with the validation request, second request, for decoding. For example, the user device determines the location information from GPS information, cellular tower information and/or the like, and includes the location information with the validation request for decoding.

In another embodiment, in the system 100, the user scans a print medium, a monitor display, an advertizing sign and/or the like for capturing one or more encoded resource identifiers related to one or more products and/or services.

In another embodiment, in the system 100, the user of the device utilizes the user device to capture one or more encoded resource identifiers related to one or more products and/or one or more services; however, the user device is unable to successfully send one or more requests for validating the one or more resource identifiers to one or more service providers. For example, the user device does not have communication network 119 availability via which it needs to send the request for validation. In such instance, the user device can store, in the device, the one or more requests and send them once it has communication network 119 availability. In one or more embodiments, the user device is unable to send a validation request due to various reasons such as low battery power, low data rate in the communication network 119, restriction on network time availability and/or the like.

In another embodiment, in the system 100, the user device receives and stores in the user device one or more validated resource identifiers for future reference.

In another embodiment, in the system 100, the transfer of content to the user device in response to one or more validation requests from the user device includes location information of the one or more validation requests. Further, the location information is utilized to indicate on a map location of the one or more validation requests. For example, validation request "A" is associated with location point "A" on a map and validation request "B" is associated with location point "B" and so on.

In another embodiment, one or more widgets 103 receive, collect, analyze, organize and/or monitor the one or more bookmarks for further processing. For example, the one or more widgets 103 categorize the one or more resource identifies by their status as to whether the one or more resource identifiers are validated or not-validated. In another embodiment, the widgets 103 utilize metadata provided by the validation services 113 and/or service provider 109 to categorize/organize the one or more resource identifiers by related types of service and/or product (e.g., as restaurants, theaters, hotels, bookstores, jewelry stores etc.), by related location information (e.g., near home, office, school, city, etc.) and/or by other available metadata. In another embodiment, the user of UE 101 has the option of categorizing/organizing the one or more resources substantially manually by using any of applications/widgets available/executable on the UE 101. In another embodiment, there are substantially different widgets to perform above discussed tasks of categorizing and/or organizing. In another embodiment, widgets 103 can validate the one or more resource identifiers substantially automatically and/or as selected by the user of UE 101. For example, the widgets 103 can be configured to validate, categorize and/or organize the one or more resource identifiers when there is, at least, a new bookmark. Further, one or more resource identifiers can be included in one validation request sent to the validation services 113 and/or to the resource validation module 107. In another embodiment, widgets 103 can present the one or more resource identifiers on a map (as points of interest, POIs) by utilizing any of the applications 103 available on the UE 101. Further, the POIs can be represented by one or more icons according to one or more resource identifier types such as bookstores, restaurants, hotels, jewelry stores and/or the like.

Figure 2:
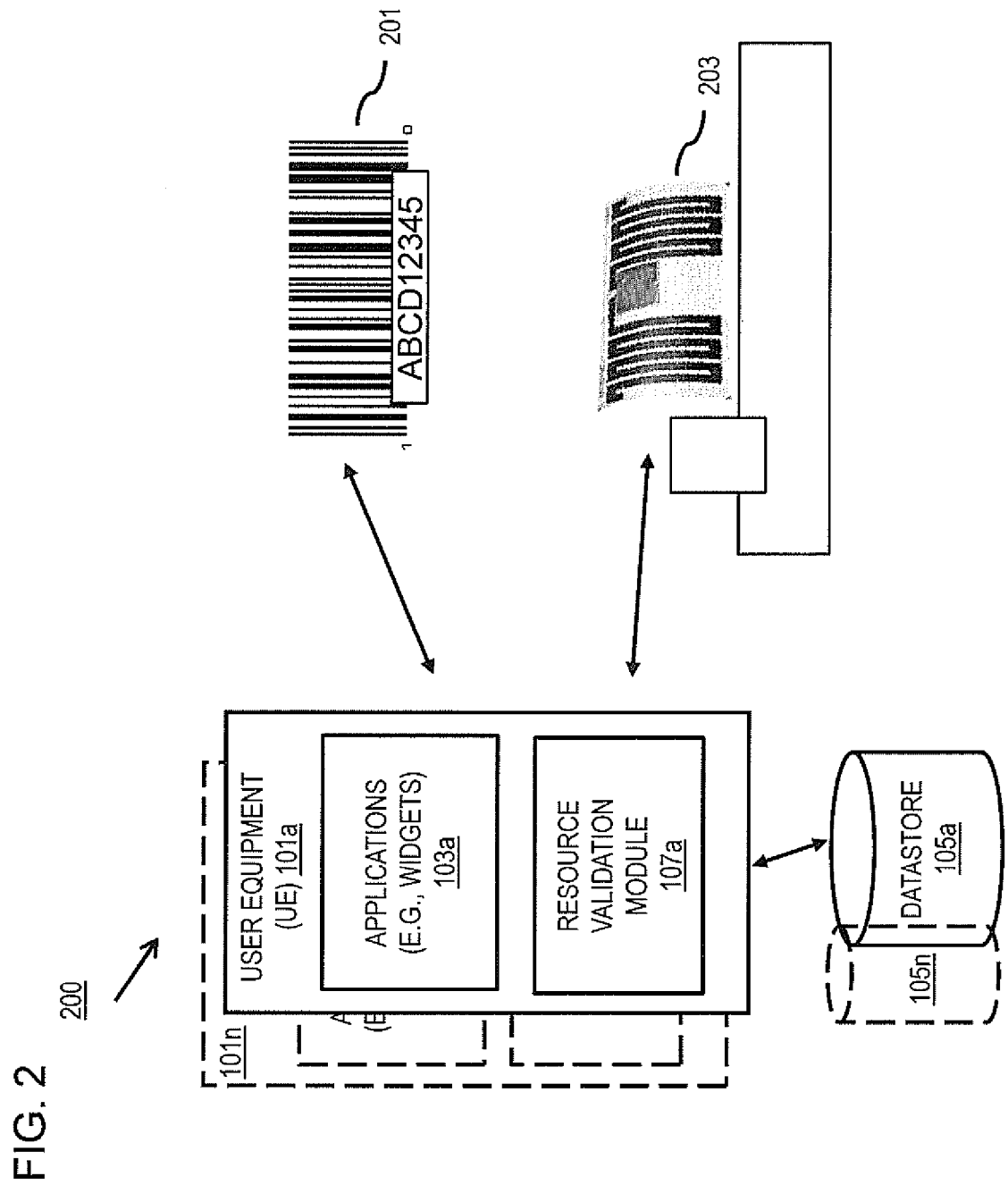
FIG. 2 is a diagram depicting a user device and encoded labels, according to one embodiment.

FIG. 2 is a diagram 200 depicting a user device and different encoded labels, according to one embodiment. In one embodiment, one or more encoded labels such as 201 and/or 203 are utilized by one or more product and/or service providers to encode information about one or more products and/or services. For example, label 201 is in the form of barcode, which generally is printed onto a surface such as paper, product cover and/or directly onto the product surface where possible. In one embodiment, UE 101 is utilized to scan/capture/read the barcode for further processing such as generating a validation request for validating one or more encoded resource identifier. Barcode encoding can be represented in patterns other than straight (vertical/horizontal) bars such as in dots, squares and/or the like. In another example, label 203 is an RFID label (also known as an RFID tag), which can have active or passive electrical circuitry and is usually attached to a product and/or to the product packaging. The RFID labels/tags are utilized to wirelessly provide encoded information, tracking means, identification and/or the like. In one embodiment, one or more sensors of UE 101 are utilized to scan the label 203 and read the encoded information for further processing such as generating a validation request for validating one or more encoded resource identifiers.

Figure 3:
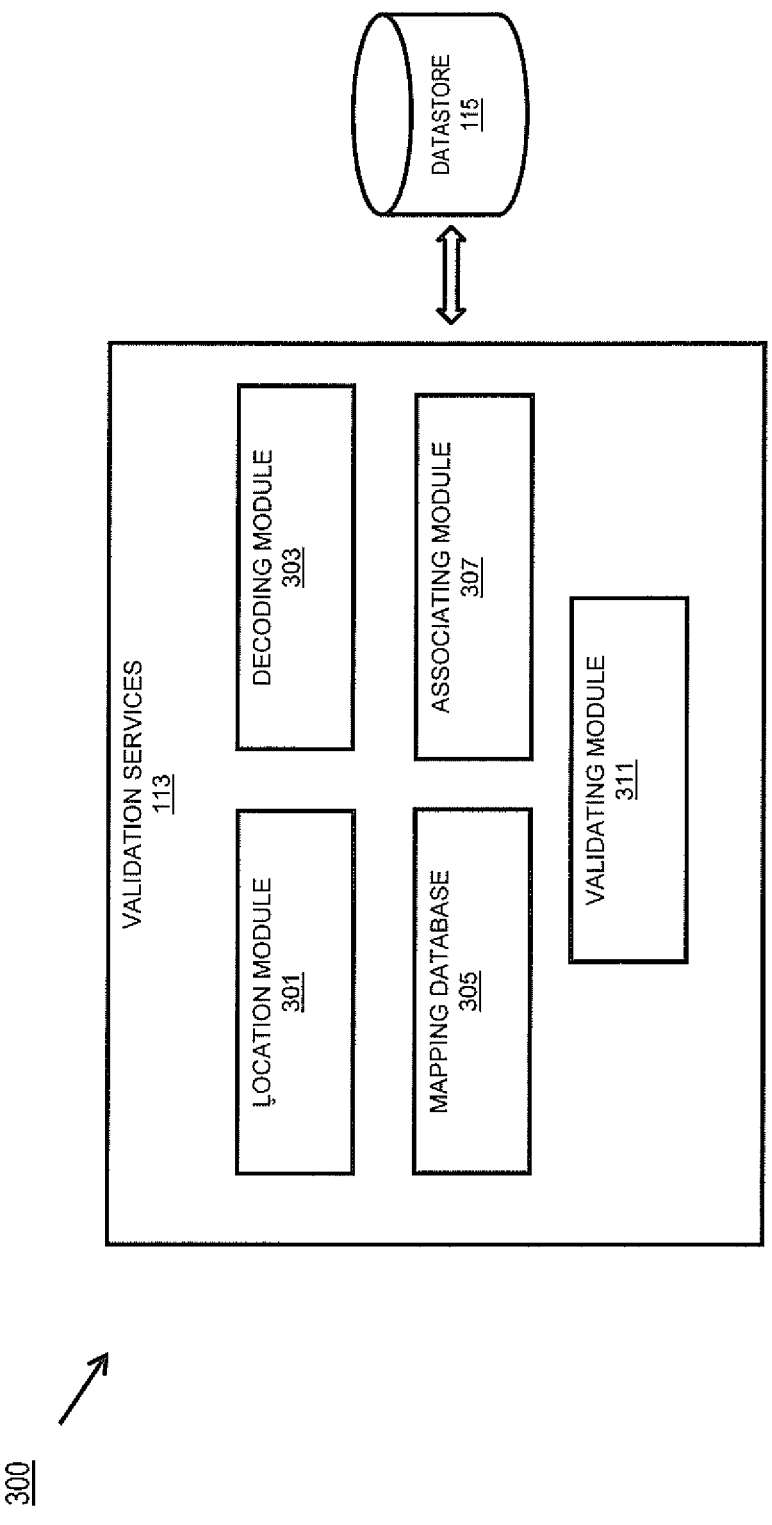
FIG. 3 is a diagram of components of a validation service, according to one embodiment.

FIG. 3 is a diagram of components of validation services 113, according to one embodiment. By way of example, the validation services 113 includes one or more components for enabling validation of one or more resource identifiers. It is contemplated that the functions of these components may be combined in one or more components or performed by other components of equivalent functionality. In one embodiment, the validation services 113 includes, at least, a location module 301, a decoding module 303, one or more mapping databases 305, one or more associating modules 307, one or more datastores 115 and a validating module 311. The location module 301 determines the location of the UE 101 based, at least, on information (e.g., location information) received from the UE 101 and/or the communication network 119.

Further, the decoding module 303 decodes the encoded resource identifier. In one embodiment, the decoding module 303 decodes the encoded resource identifier by following the web link as indicated by the encoded resource identifier in order to obtain the full address of the resource. In another embodiment, the decoding module 303 decodes the encoded resource identifier by searching datastore 115 and/or one or more other datastores for a match and to obtain the full address of the resource. In another embodiment, the decoding module 303 stores one or more decoded resource identifiers onto the datastore 115 and/or one or more other datastores.

Furthermore, the validation services 113 can utilize mapping database 305 to determine location of the UE 101 for including a mapping preview when transferring content to the UE 101. Moreover, the association module 307 matches the decoded resource identifier to one or more full URL addresses. In one embodiment, the encoded resource identifier can be associated with one or more web sites as the association can depend on different parameters such as location of the UE 101, time, date and/or the like. In another embodiment, the association module 307 stores one or more associated resource identifiers onto the datastore 115 and/or one or more other datastores.

Additionally, the validating module 311 validates one or more resource identifiers. In one embodiment, the validation is done, at least in part, by examining resource's content compatibility with a given user device such as UE 101. In one embodiment, the validation is done, at least in part, by determining the compatibility with web standards and known web browsing application compatibilities. In one embodiment, the validation is done, at least in part, by examining geographical location of the resource. In one embodiment, the validation is done, at least in part, by examining content at the resource based on image analysis, keyword detection, and/or detection of malicious code. In one embodiment, the validation is done, at least in part, by determining if a re-routing is suggested from the original resource to a suspicious one. In one embodiment, the validation is done, at least in part, by searching one or more datastores to determine if one or more users, government bodies, service providers, and/or the like, have previously determined validity of the resource being processed.

In another embodiment, the validating module 311 utilizes one or more associated resource identifiers available from the associating module 307. In another embodiment, the validating module 311 utilizes one or more decoded resource identifiers available from the decoding module 303. Moreover, if one or more resources were evaluated to be substantially valid, then data from the one or more validations can be used to update the one or more datastores 105, 111 and 115, and/or other datastores.

The UE 101, service provider 109 and validation services 113 can communicate with each other, other network elements and/or access other data stores by communicating, for example, over the communication network 119. By way of example, the communication network 119 of system 100 includes one or more networks such as a data network (not shown), a wireless network (not shown), a telephony network (not shown) or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UE 101, the service provider 109, and the validation services 113 communicate with each other and other components of the communication network 119 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the validation services 113 and/or service provider 109 may interact according to a client-server model with the applications 103 and/or resource validation module 107 of the UE 101. According to the client-server model, a client process sends a message including a request to a server process, and the server process responds by providing a service (e.g., messaging, e-mail, gaming, social networking, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 4:
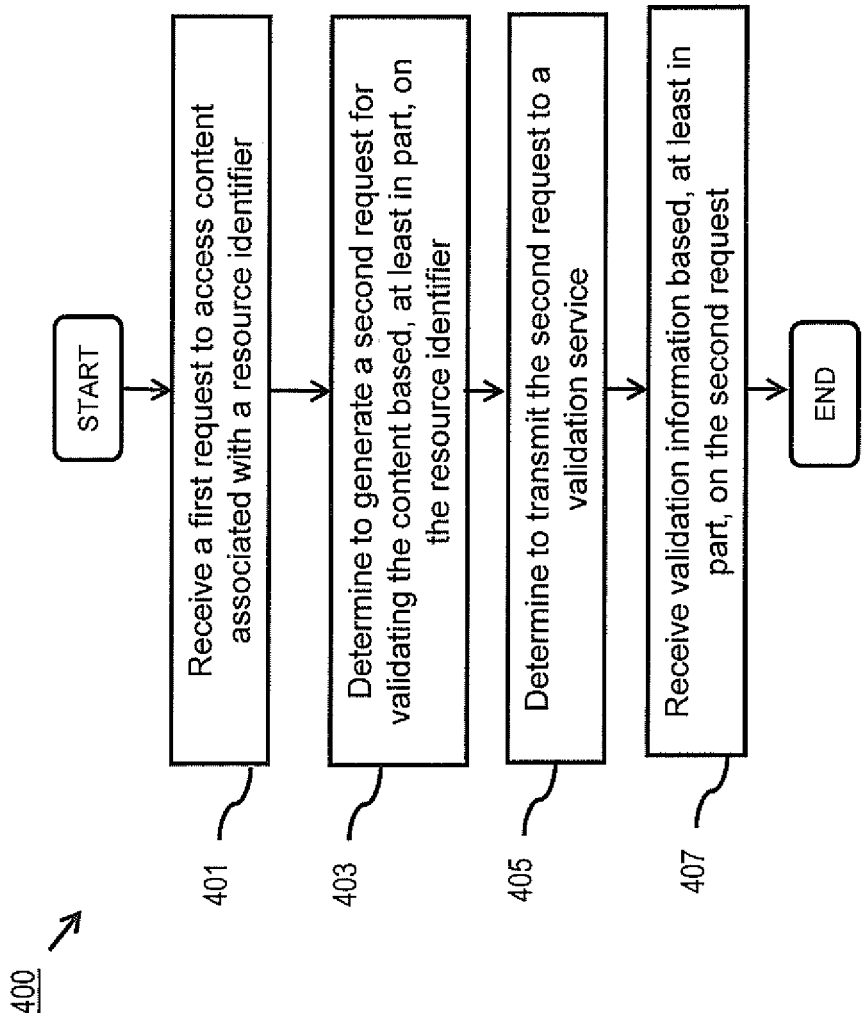
FIG. 4 is a flowchart depicting a process for receiving a request to access content associated with a resource identifier, according to one embodiment.

FIG. 4 is a flowchart depicting a process 400 for receiving a request to access content associated with a resource identifier, according to one embodiment. In one embodiment, the validation services 113 performs the process 400 and is implemented in, for instance, a chip set including a processor and a memory as shown FIG. 12. In addition or alternatively, the resource validation module 107 may perform all or a portion of the process 400. At 401, the validation services 113 or the resource validation module 107 receives a first request to access content associated with a resource identifier. In one embodiment, the access request is generated by the user of the UE 101, interested in further information on one or more products and/or services. In one example use case, the access request is for the user to access further specification information on a product available at a retail establishment. Another example of access request is for the user to access one or more web sites for purchasing a product advertized in a magazine.

At step 403, for example, the resource validation module 107 generates a second request for validating the content based, at least in part, on the resource identifier. At 405, for example, the second request is transmitted to a validation service. In an embodiment, the resource validation module 107 determines that the validation can, at least in part, be done at UE 101 resource validation module 107 so the second request is processed at UE 101. In another embodiment, the validation request is sent to the validation services 113. At 407, for example, the resource validation module 107 receives validation information based, at least in part, on the second request.

Figure 5:
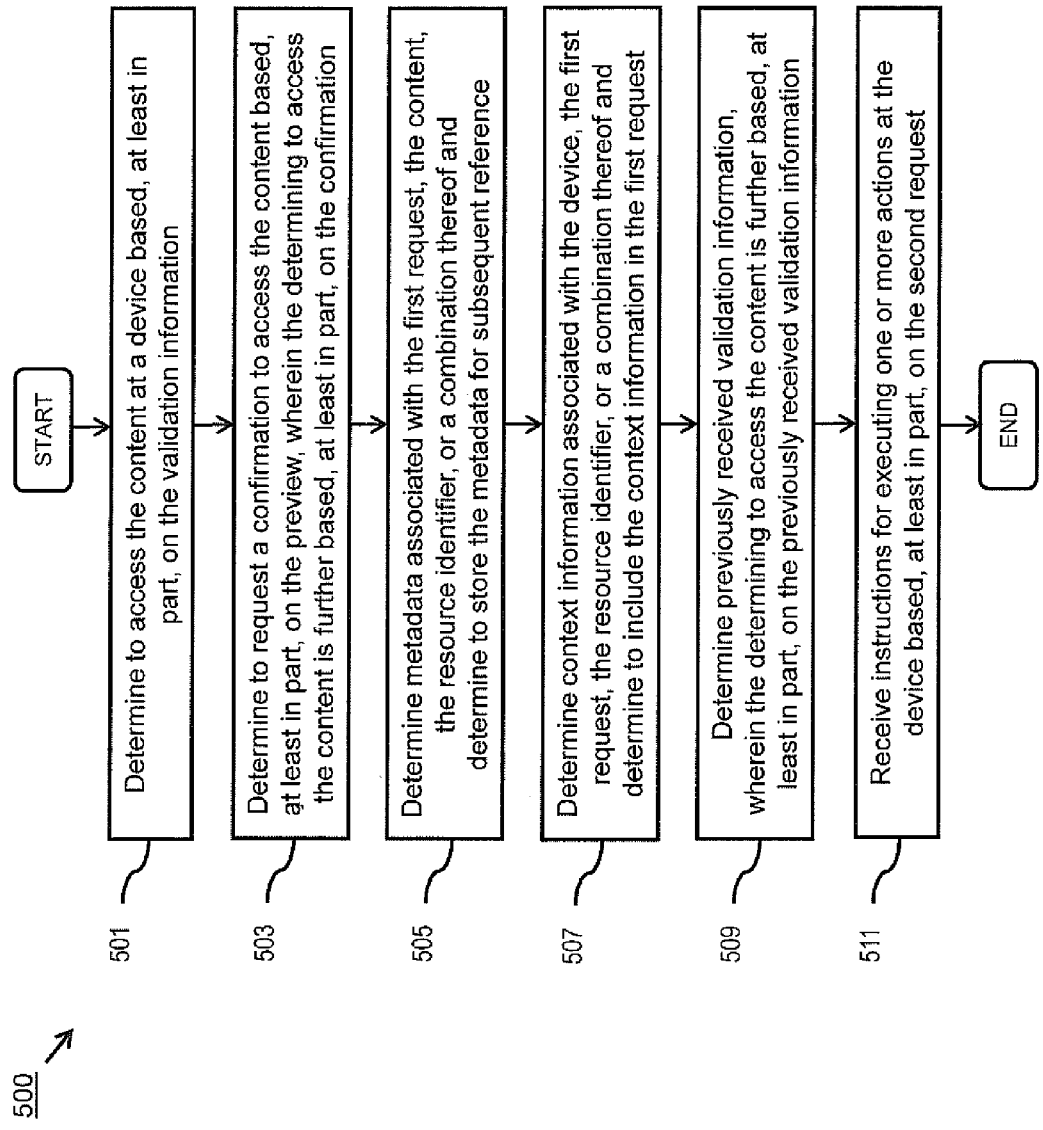
FIG. 5 is a flowchart depicting a process for accessing content at one or more resource identifiers, according to one embodiment.

FIG. 5 is a flowchart depicting a process 500 for accessing content at one or more resource identifiers, according to one embodiment. In one embodiment, the validation services 113 and/or the resource validation module 107 perform the process 500 and are implemented in, for instance, a chip set including a processor and a memory as shown FIG. 12. In order to provide information regarding an encoded, or otherwise modified, resource identifier, the validation services 113 and/or resource validation module 107 can transfer discovered information and/or one or more content from the one or more resource to the UE 101. Then the user of UE 101 can decide whether to, for example, visit a web site at the resource, execute an action on the user device as suggested by the resource or to reject the resource.

At step 501, the UE 101, at least in part, determines to access the content at a device based, at least in part, on the validation information. In an embodiment, the system 100 may wait for the validation information before determining to access the content. In this way, the user can be assured of knowing the potential risks associated with accessing the content identified by the resource identifier.

At step 503, the UE 101 requests a confirmation to access the content based, at least in part, on the preview, wherein the determining to access the content is further based, at least in part, on the confirmation. In one embodiment, the system 100 enables the user device to access the content without waiting to receive the validation information. In this mode of operation, the validation process is optional and can proceed in parallel with access to the content. In yet another embodiment, the mode of operation may be selected based on context information associated with the user device. For example, the system 100 may determine whether the user device has connectivity to the validation service. If there is no connectivity (e.g., when there is no network connection), the system 100 may bypass waiting for the validation information before determining to access the content.

At step 505, the UE 101 and/or the validation services 113 determine metadata associated the first request, the content the resource identifier, or a combination thereof, and then determine to store the metadata for subsequent for reference. In one embodiment, when a content request is generated and/or received, one or more metadata are associated with the content request. In one embodiment, the UE 101 associates with the content request time, date, climate condition information, user device type and/or the like.

At step 507, context information is associated with the device, the first request, the resource identifier, or a combination thereof and the context information is included in the first request. In one embodiment, location information is associated with the first request. In another embodiment, the user device location information is available from the user device such as from the user device GPS information. In another embodiment, the location module 301 determines the user device location information based on information available from the communication network 119. For example, the mapping database 305 utilizes information from the location module 301 to map locations of the UE 101 and one or more received content requests.

At 509, the UE 101, the validation service 113, and/or the resource validation module 107 determine previously received validation information, wherein the determining to access the content is further based, at least in part, on the previously received validation information. In one embodiment, access to one or more resource information can be made by examining one or more previously received validation information at one or more datastores such as datastore 105.

At step 511, the UE 101 and/or the resource validation module 107 receive instructions for executing one or more actions at the device based, at least in part, on the second request. In one embodiment, one or more options to execute one or more actions are transferred to the UE 101. For example, the user of the user device can be prompted to accept to connect to one or more resources, reject connection to the one or more resources, request for more information related to the one or more resources and/or the like.

FIGS. 6-10 depict examples of one or more user interfaces for validation services on a user device, according to one or more embodiments.

Figure 6:
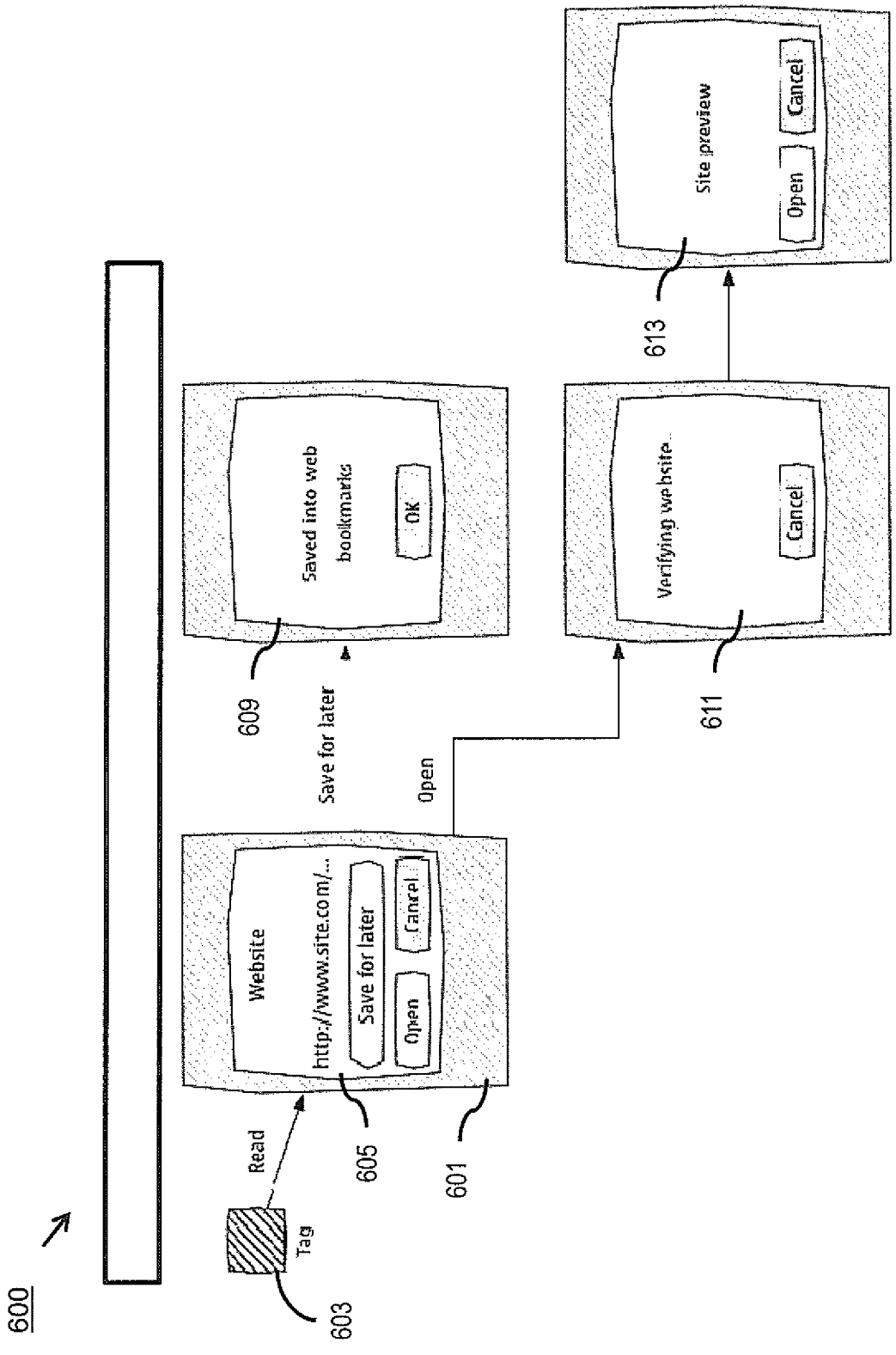

FIG. 6 depicts an example user interface 600 presenting different options available at a user device for when capturing one or more encoded resource identifiers, according to one or more embodiments. In one embodiment, the user device 601 captures one or more encoded resource identifiers such as 603. The user of the user device 601 is prompted to choose from one or more available options such as 605. Based on the chosen option, one or more of applications 103 at the UE 101, execute upon the chosen option, for example 609 and 611. By selecting option 609, the encoded resource identifier is saved into the datastore 105 and/or other datastores available to the UE 101. Selecting option 611, at least in part, causes the UE 101 to generate a validation request for the encoded resource identifier. At 613, the validating services 113, transfers or initiates the transfer of all or a portion of the decoded resource content. For example, one or more previews of one or more content available at the one or more resources are presented at the UE 101 (e.g., products, services, applications, games, audio/video available for download and/or the like).

Figure 7:
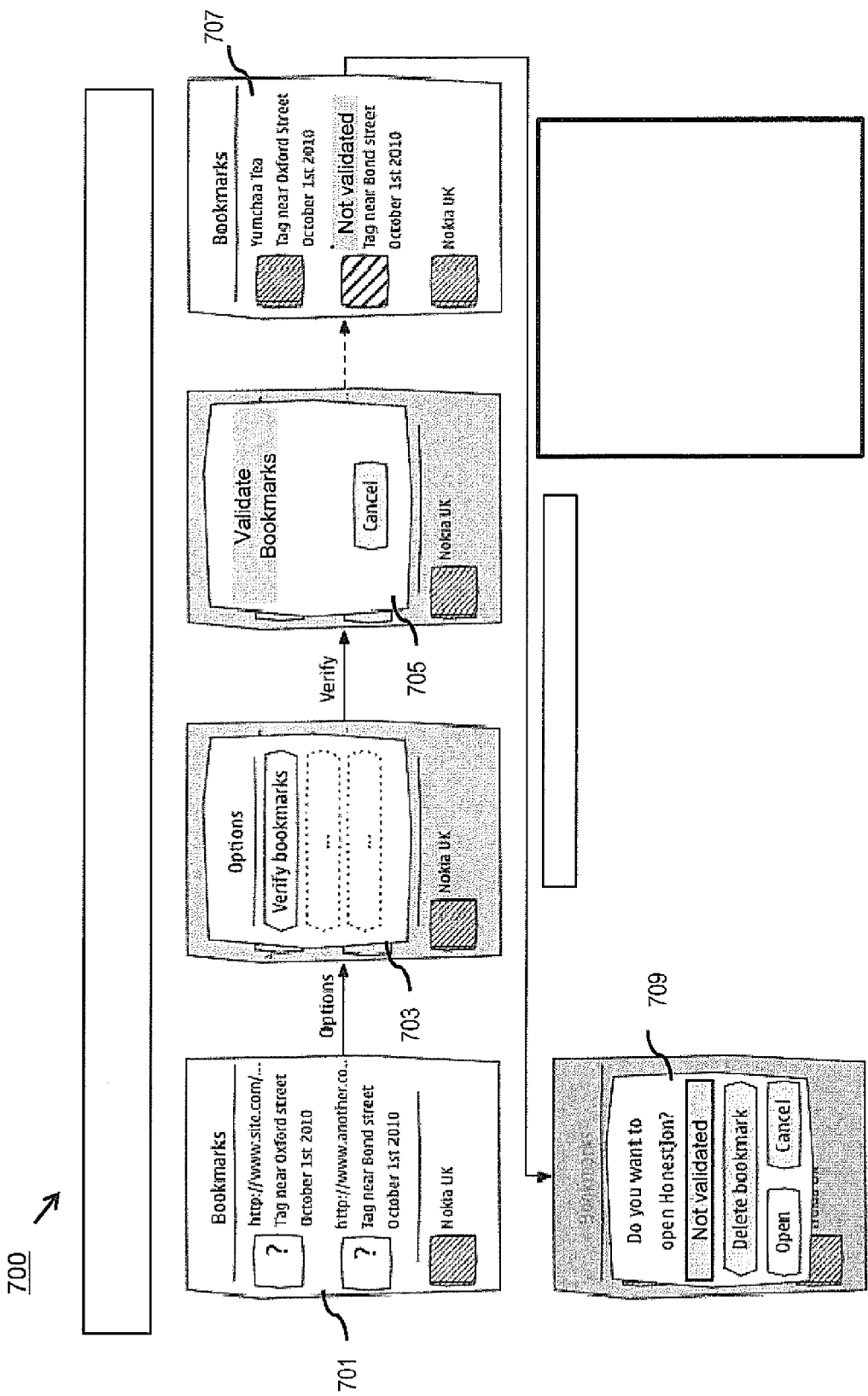

FIG. 7 depicts an example user interface 700 presenting different options available at a user device for further processing of one or more encoded resource identifiers stored at the user device and/or other datastores available to the user device, according to one or more embodiments. In one embodiment, 701 depicts one or more previously captured encoded resource identifiers, which are stored at UE 101, for example, as "bookmarks". Further, at 703 the user is prompted with one or more options regarding the one or more stored encoded resource identifiers. The user can select to request validation of the one or more stored "bookmarked" encoded resource identifiers depicted at 705. The previously saved one or more encoded resource identifiers can have one or more metadata associated with the one or more resource identifiers depicted in 707. For example, time, date, location information and/or the like can be associated with the one or more resource identifiers. In another embodiment, one or more encoded resource identifiers cannot be validated and are marked with one or more metadata to, at least in part, indicate that they are not validated, as depicted in 707. In another embodiment depicted in 709, the user is prompted to select from one or more options available on one or more resources not validated. For example, at 709 the user is presented with options to delete or open a not-validated stored bookmark.

Figure 8:
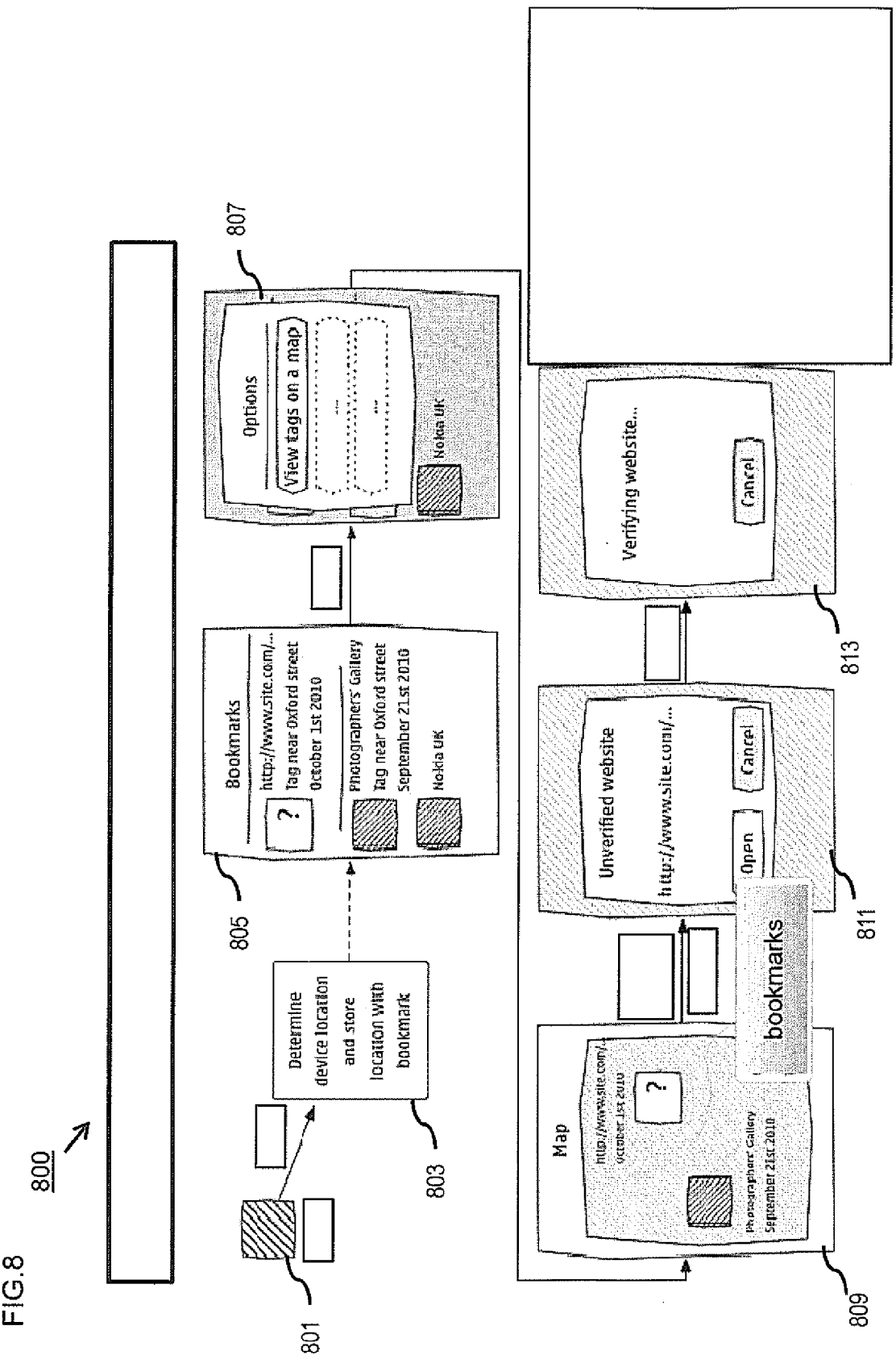

FIG. 8 depicts an example user interface 800 presenting different options available at a user device for further processing and accessing one or more resource identifiers, according to one or more embodiments. In one embodiment, an encoded resource identifier 801 is captured by a user device, for example, 801 is a barcode. The user device associates location information with the encoded resource identifier at 803 and it is stored at the user device, for example, as a "bookmark" at 805. Further, the user is prompted with one or more options regarding the one or more stored encoded resource identifiers at 807. Furthermore, the location information of the one or more encoded resource identifiers can be utilized, at 809, to map the one or more encoded resource identifiers utilizing a mapping application. The mapped one or more encoded resource identifiers can still be sent for validation at 811 and/or 813 directly from the mapping application. In one embodiment, one or more resource identifiers can be presented to the user via a mapping application and the one or more resource identifiers can be selected for access, for validation, for preview, for sharing with one or more other users and/or applications, and/or the like.

FIG. 9A depicts an example user interface 900 presenting different options available at a user device for determining duplicates of one or more resource identifiers, according to one or more embodiments. In one embodiment, the user device captures multiple encoded resource identifiers A, B, C, D and E, which are depicted at 901. Further, at 903 the user device requests the validating service 113 to determine if there are duplicates in the multiple encoded resource identifiers. For example, one of the applications 103 at the UE 101 determines to verify if there any duplicate bookmark entries. Further, the validating service 113 determines there are one or more duplicate encoded resource identifier and at 905 the duplicates are filtered out and the remaining encoded resource identifier are stored as "bookmarks" at the user device. In another embodiment, the duplicate entries are saved as different bookmark entries with different metadata. For example, one or more duplicate resource identifiers can be from different locations, different dates, and/or the like, which the user may wish to retain.

FIG. 9B depicts diagrams of a user interface utilized in the processing of one or more resource identifiers, according to one or more embodiments. User interface 931 of FIG. 9B depicts a UE 101 (e.g., a smartphone) executing one or more widgets 933 processing one or more resource identifiers. In one embodiment, the widgets 933 initiate a check for any resource identifier updates in the "bookmarks" and/or in other applications upon the user initiating a manual validate request by the user selecting the "validate" button 937. In other embodiments, the widgets 933 need not display a message such as 935 and may proceed to substantially automatically validate the one or more resource identifiers 933 in the background and on completion of the one or more validations, the one or more widgets 933 in user interface 941 displays a message 943 that the one or more have been validated. In another embodiment, the widgets 933 can initiate a presentation of the one or more resources (validated and/or not-validated) on a map or can render the presentation when the user requests so by selecting "MAP" button 939. For example, the presentation on a map can be preformed, at least in part, by the widgets 933 and/or in conjunction with one or more applications.

Figure 10:
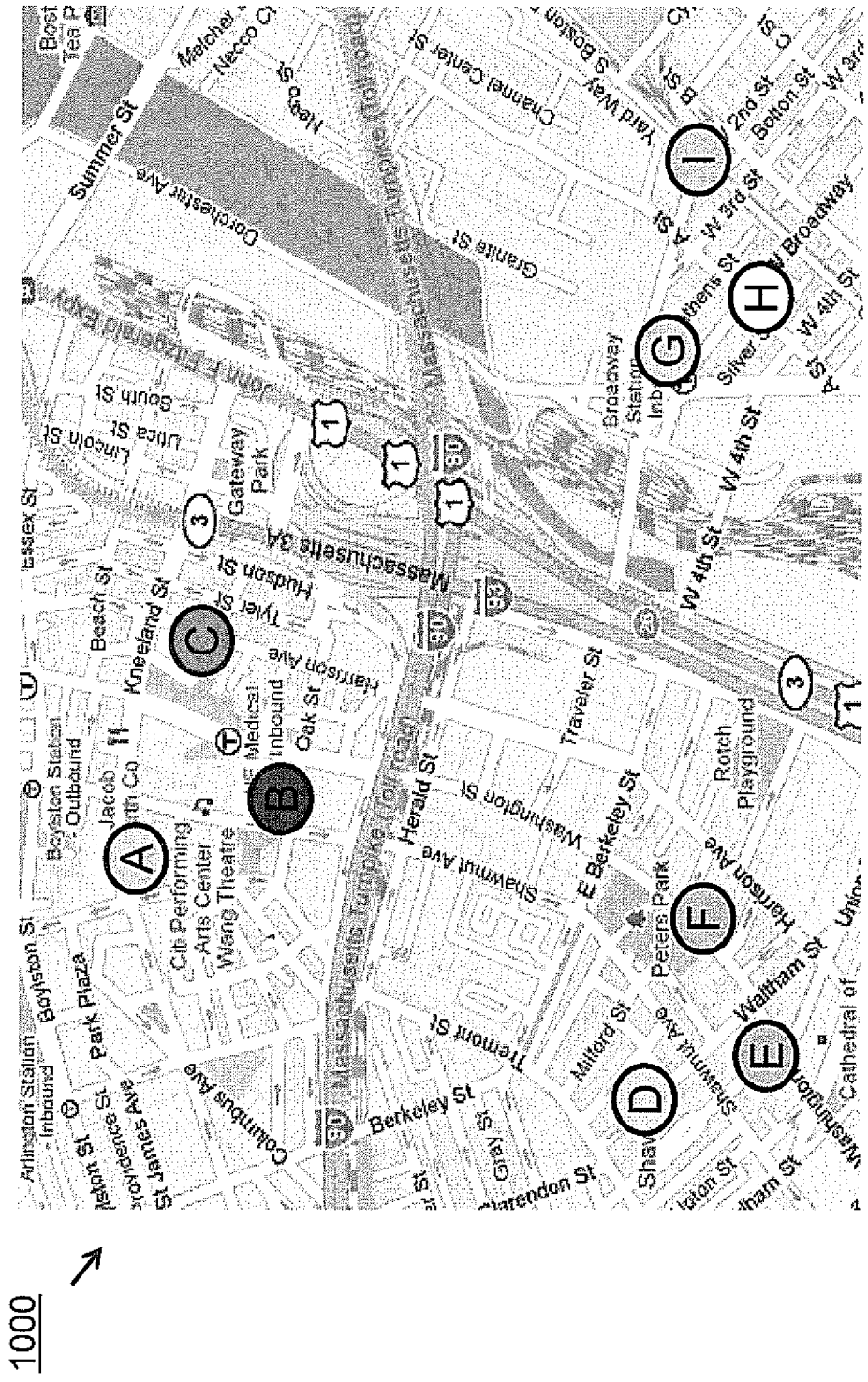

FIG. 10 depicts a geographical location 1000 indicating locations of one or more resource identifiers, according to one or more embodiments. One or more of the applications 103 in the UE 101 can present one or more resource identifiers via a mapping application by utilizing location information of the one or more resource identifiers. In one embodiment, resource identifier points (A), (B), (C), (D), (E), (F), (G), (H) and (I) are positioned at locations where the user device captured the corresponding encoded resource identifiers. As previously discussed, encoded resource identifiers, (A) through (I), can be related to one or more products and/or services, can be captured at one or more locations, can be from different sources and/or the like. Although points (A) through (I) are captured at different locations and are labeled differently, in one embodiment, one or more of the points (A) through (I) can substantially be same as another point. In another embodiment, at the time of capturing one or more resource identifiers, the location information for the one or more resource identifiers is not available and the missing location information is later determined and associated with the one or more resource identifiers respectively. For example, the missing location information can be determined from the communication network 119 information, user device GPS information and/or the like.

The processes described herein for providing validating services may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
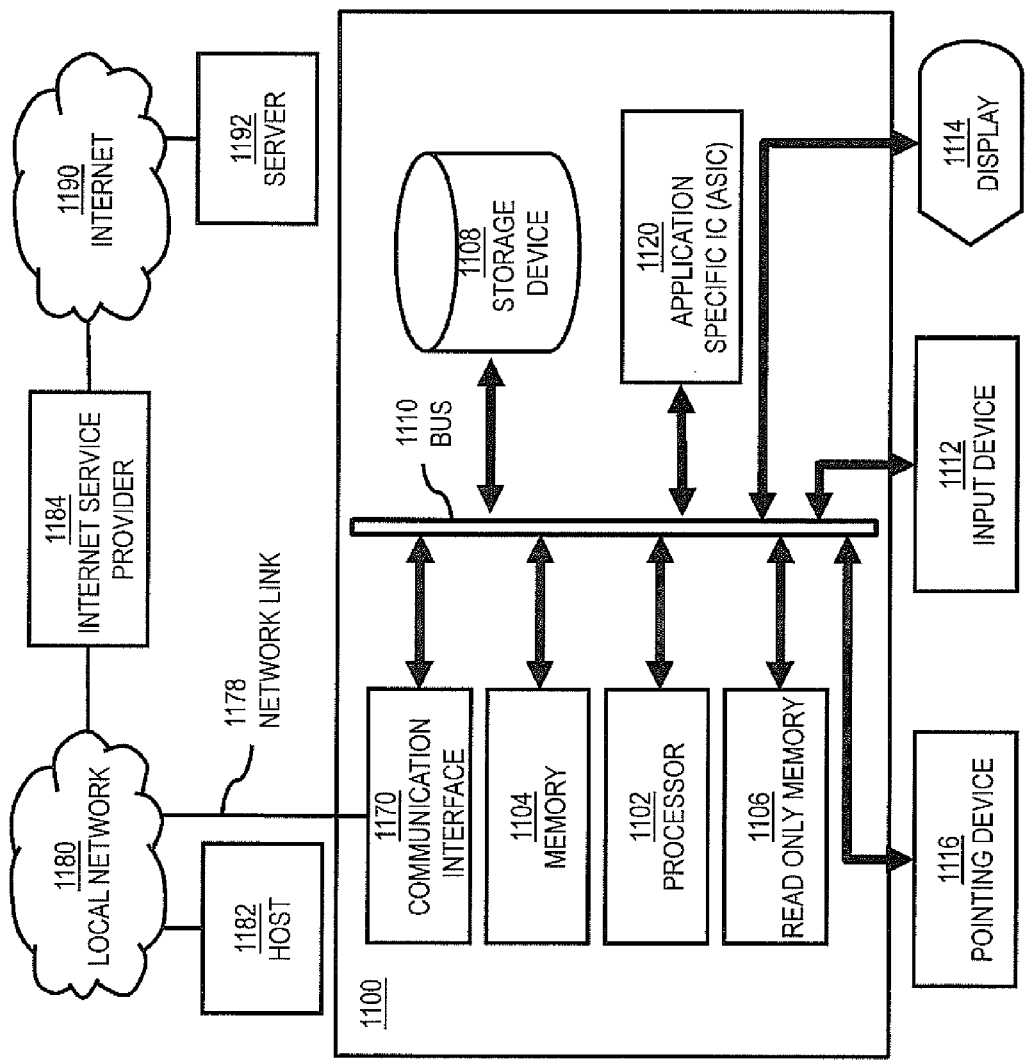
FIG. 11 is a diagram of hardware that can be used to implement an embodiment of the invention.

FIG. 11 is a diagram of hardware that can be used to implement an embodiment of the invention. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide validating services as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing validation services.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing validation services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing validation services. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing validating services, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 119 for providing content and validation services.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
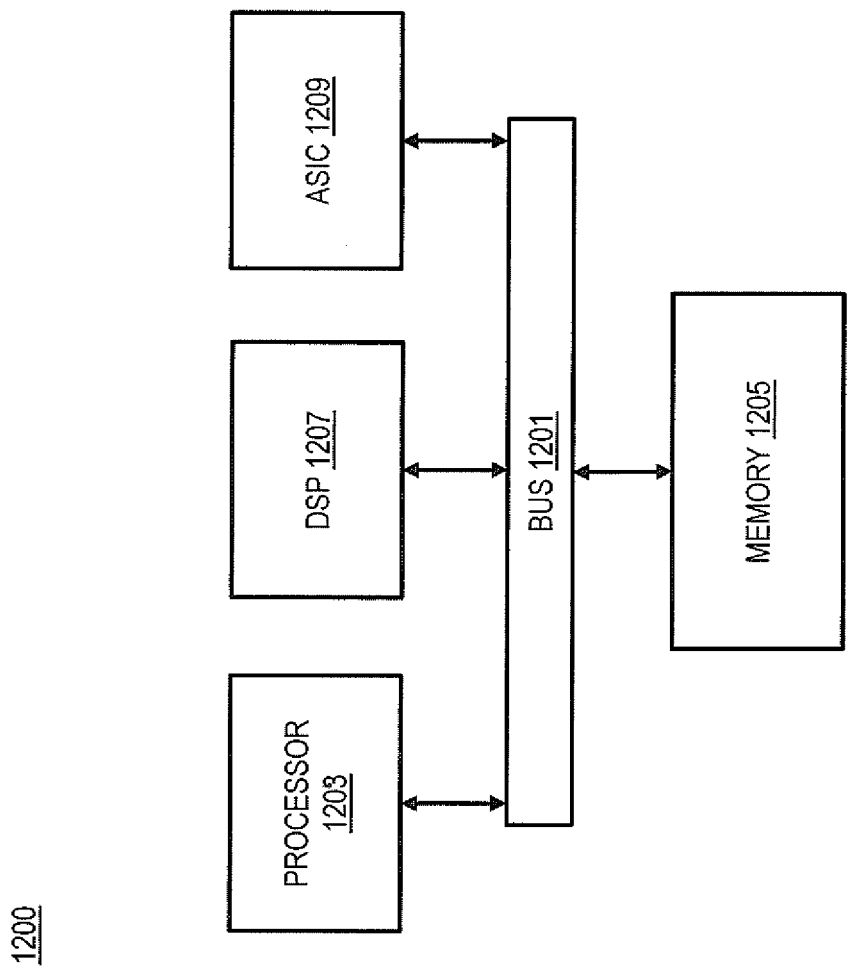
FIG. 12 is a diagram of a chip set that can be used to implement an embodiment of the invention.

FIG. 12 is a diagram of a chip set 1200 that can be used to implement an embodiment of the invention. Chip set 1200 is programmed to provide content and validation services, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of services. Chip set or chip 1200, or a portion thereof, constitutes a means for performing one or more steps of providing validation services.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide validation services. The memory 1205 also stores the data associated with or generated by the execution of the inventive steps.

Figure 13:
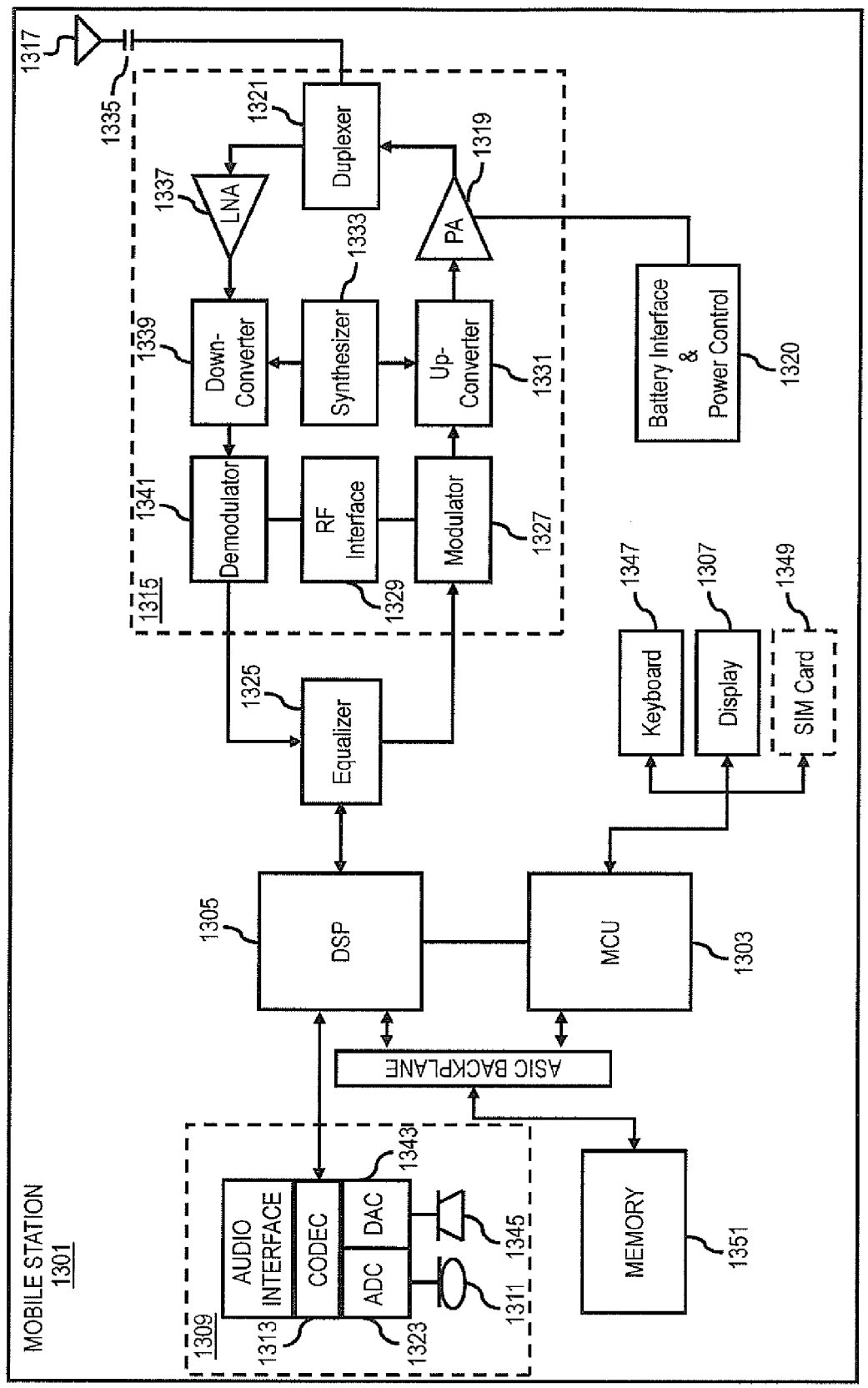
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of providing validation services. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing validation services. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to interface with one or more validation services. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a first request to access content associated with a resource identifier;
   determining, by a processor, to generate a second request for validating the content based, at least in part, on the resource identifier;
   determining to transmit the second request to a validation service;
   receiving validation information based, at least in part, on the second request;
   determining to access the content at a device; and
   determining previously received validation information,
   wherein the determining to access the content is based, at least in part, on the previously received validation information.

2. A method of claim 1,
   wherein the determining to access the content at the device is further based, at least in part, on the validation information.

3. A method of claim 2, wherein the validation information includes a preview of the content, the method further comprising:
   determining to request a confirmation to access the content based, at least in part, on the preview, wherein the determining to access the content is further based, at least in part, on the confirmation.

4. A method of claim 1, further comprising:
determining metadata associated with the first request, the content, the resource identifier, or a combination thereof; and
determining to store the metadata for subsequent reference.

5. A method of claim 1, further comprising:
determining context information associated with the device, the first request, the resource identifier, or a combination thereof; and
determining to include the context information in the first request.

6. A method of claim 1, further comprising determining a mode of operation based on context information associated with the device.

7. A method of claim 1, further comprising:
receiving instructions for executing one or more actions at the device based, at least in part, on the second request.

8. A method of claim 1, further comprising:
determining location information associated with the first request, the content, the resource identifier, or a combination thereof; and
determining to present the location information.

9. A method of claim 1, wherein the validation information includes information on security risks, content ratings, content source, or a combination thereof.

10. A method of claim 1, wherein the resource identifier is in an encoded form.

11. An apparatus comprising:
at least one processor; and
at least one memory including computer program code for one or more programs, the at least one memory and the computer program code configured to, with the at least one processor, cause the apparatus to perform at least the following,
receive a first request to access content associated with a resource identifier;
determine to generate a second request for validating the content based, at least in part, on the resource identifier;
determine to transmit the second request to validation service;
receive validation information based, at least in part, on the second request;
determine to access the content at a device; and
determine previously received validation information,
wherein the determining to access the content is based, at least in part, on the previously received validation information.

12. An apparatus of claim 11, wherein the
determining to access the content at the device is further based, at least in part, on the validation information.

13. An apparatus of claim 12, wherein the validation information includes a preview of the content, and wherein the apparatus is further caused to:

determine to request a confirmation to access the content based, at least in part, on the preview, wherein
the determining to access the content is further based, at least in part, on the confirmation.

14. An apparatus of claim 11, wherein the apparatus is further caused to:
determine metadata associated with the first request, the content, the resource identifier, or a combination thereof; and
determine to store the metadata for subsequent reference.

15. An apparatus of claim 11, wherein the apparatus is further caused to:
determine context information associated with the device, the first request, the resource identifier, or a combination thereof; and
determine to include the context information in the first request.

16. An apparatus of claim 11, wherein the apparatus is further caused to:
determine a mode of operation based on context information associated with the device.

17. A method comprising facilitating access to at least one interface configured to allow access to at least one service, the at least one service configured to perform at least the following:
receiving a first request to access content associated with a resource identifier;
determining, by a processor, to generate a second request for validating the content based, at least in part, on the resource identifier;
determining to transmit the second request to validation service;
receiving validation information based, at least in part, on the second request;
determining to access the content at a device; and
determining previously received validation information,
wherein the determining to access the content is based, at least in part, on the previously received validation information.

18. A method of claim 17, wherein the determining to access the content at the device is further based, at least in part, on the validation information.

19. A method of claim 18, wherein the validation information includes a preview of the content, and wherein the at least one service is further configured to perform:
determining to request a confirmation to access the content based, at least in part, on the preview, wherein
the determining to access the content is further based, at least in part, on the confirmation.

20. A method of claim 17, wherein the at least one service is further configured to perform:
determining metadata associated with the first request, the content, the resource identifier, or a combination thereof; and
determining to store the metadata for subsequent reference.

* * * * *